United States Patent [19]

Steinberg

[11] Patent Number: 4,615,666
[45] Date of Patent: Oct. 7, 1986

[54] APPARATUS FOR FLATTENING BLOWN-FOIL TUBES

[75] Inventor: Klaus Steinberg, Troisdorf-Sieglar, Fed. Rep. of Germany

[73] Assignee: Reifenhauser GmbH & Co. Maschinenfabrik, Troisdorf, Fed. Rep. of Germany

[21] Appl. No.: 740,959

[22] Filed: Jun. 4, 1985

[30] Foreign Application Priority Data

Jun. 9, 1984 [DE] Fed. Rep. of Germany ....... 3421680

[51] Int. Cl.⁴ .............................................. B29C 53/20
[52] U.S. Cl. ................................... 425/72 R; 264/564; 425/183; 425/326.1; 425/387.1; 425/392
[58] Field of Search ........... 425/436 R, 436 RM, 397, 425/183, 72 R, 326.1, 387.1, 403; 264/514, 209.1, 209.3, 564, 566

[56] References Cited

U.S. PATENT DOCUMENTS

| | | | |
|---|---|---|---|
| 2,697,852 | 12/1954 | Bailey | 264/566 |
| 3,223,762 | 12/1965 | Fry, Jr. | 264/209.3 X |
| 3,335,208 | 8/1967 | Harris | 264/566 |
| 3,848,035 | 11/1974 | Behr | 264/209.3 X |
| 3,980,418 | 9/1976 | Schott, Jr. | 264/564 X |
| 4,170,624 | 10/1979 | Dawson | 264/209.3 X |
| 4,355,966 | 10/1982 | Sweeney et al. | 264/564 X |
| 4,377,540 | 3/1983 | Cluett et al. | 425/326.1 X |
| 4,388,061 | 6/1983 | Bebok | 264/566 X |
| 4,479,766 | 10/1984 | Planeta | 264/564 X |

FOREIGN PATENT DOCUMENTS

| | | | |
|---|---|---|---|
| 121877 | 10/1978 | Japan | 264/515 |
| 115227 | 9/1981 | Japan | 425/326.1 |

*Primary Examiner*—Richard L. Chiesa
*Attorney, Agent, or Firm*—Karl F. Ross; Herbert Dubno

[57] ABSTRACT

A blown-foil tube is flattened between a pair of frames having ladder arrays of flattening elements in respective assemblies spaced along the path of the tube. Each assembly has a wood bar element and a roller element on a pair of plates pivotally mounted on the frame so that one or the other element can be selectively presented to the tube.

10 Claims, 5 Drawing Figures

APPARATUS FOR FLATTENING BLOWN-FOIL TUBES

FIELD OF THE INVENTION

My present invention relates to an apparatus for flattening blown-foil tubes and, more particularly, to an apparatus of the type in which the foil passes between ladder-like arrays of flattening elements upon respective frames.

BACKGROUND OF THE INVENTION

It is known to produce synthetic resin (thermoplastic) sheet materials by extruding the thermoplastic material and then expanding the extruded strand by blowing it, i.e. the production of a blown-foil tube. The latter, after it has been cooled sufficiently to become dimensionally stable, must be flattened to permit further processing and/or coiling in a roll.

For this purpose an apparatus designed to flatten blown-foil tubes in connection with the manufacture of plastic foils can comprise two facing or juxtaposed steel frames that are equipped, ladder fashion, with flattening assemblies.

The steel frames facing each other may form a wedge-shaped flattening zone, or may be arranged parallel to each other. Their lengths conform to the specific requirements of each plant; their widths—at least in the upper area—conform to the width of the flattened blown-foil tube.

Currently, the industry makes use of an apparatus, made up of single flattening elements which are arranged ladder fashion, and attached to longitudinal bars of the respective frame.

However, according to the type of material used and other plant conditions, the flattening elements must be modified to suit varying needs and flattening functions.

Thus, known flattening elements for engagement with a blown-foil tube, can include straight rounded-edge wood bars, which press against the plastic foils take place.

It is also known to provide flattening elements which are constructed more or less in a curved fashion—rather than straight.

Finally, there are flattening elements constructed in the form of rolls, so that the plastic foils are subjected to a rolling type friction. Particularly in the production of plastic foils made of polyethylene such rolls are used.

On the other hand, the industry makes use of plants where the extrusion unit permits the production of different plastics. In this type of foil-blowing installation, when changing from one type of plastic to another, steel frames have to be replaced with an obvious increase in production cost, to substitute suitable foil-engaging elements.

OBJECT OF THE INVENTION

The object of my present invention is to provide an improved apparatus which would eliminate the need to exchange or replace steel frames during a production switch from one type of plastic to another or for other technical and economic reasons.

SUMMARY OF THE INVENTION

This object and others which will become apparent hereinafter are attained in accordance with the invention in an apparatus for flattening a blown-foil tube in which a pair of opposing frames are disposed on opposite sides of the blown-foil tube passing between the frames, each of the frames having a pair of longitudinally extending frame members. A multiplicity of flattening assemblies are spaced along each frame in this direction.

According to the invention, each of the assemblies has a pair of differently functioning flattening elements extending parallel to one another between the respective frame members in ladder-ring orientation.

Respective end plates carry both of the differently functioning elements of each assembly at opposite ends of these elements.

Means is provided for mounting the end plates on the respective frames so as to enable said assemblies to pivot about a respective axis parallel to these elements between a position in which one of the elements of each assembly is engageable with the tube and a position wherein the other element is engageable with the tube.

Preferably one of these elements of each assembly is a wood bar having a rounded edge while the other element is a roller. The plates of a member of such assemblies, preferably all the assemblies on each frame, are interconnected by a bar so that the assemblies pivot together.

Thus, the invention combines at least two flattening elements with different flattening functions, parallel to each other between end or head plates, to form each individual flattening assembly. Furthermore, the assembly is pivotable around an axis parallel to the flattening elements so that the flattening assembly may be rotated to facilitate distinct and variable positions of the flattening elements.

For most operations, it is sufficient to combine into a single flattening apparatus one flattening element, constructed of a wooden molding, and a second flattening device, constructed in the shape of a roller.

To place in effect or remove from active status flattening elements with different flattening functions, it is only necessary to adjust the individual flattening assemblies manually.

However, it is also possible, parallel to the bar or frame member and pivotally connected to the plates of the flattening assemblies, to attach an adjustable rod or bar (connecting bar) which, in turn, is connected via a lever arm attached to one such plate, to a positioning device which can be a servo motor; consequently, all flattening apparatus units can be moved at the same time. The adjustable rod can be operated by means of a screw drive (spindle) with a handwheel or a pneumatic or hydraulic servomotor with a cylinder-piston-type of arrangement.

BRIEF DESCRIPTION OF THE DRAWING

The above and other objects, features and advantages will become more readily apparent from the following description, reference being made to the accompanying drawing in which.

SPECIFIC DESCRIPTION

Figures 1, 2A, 4:
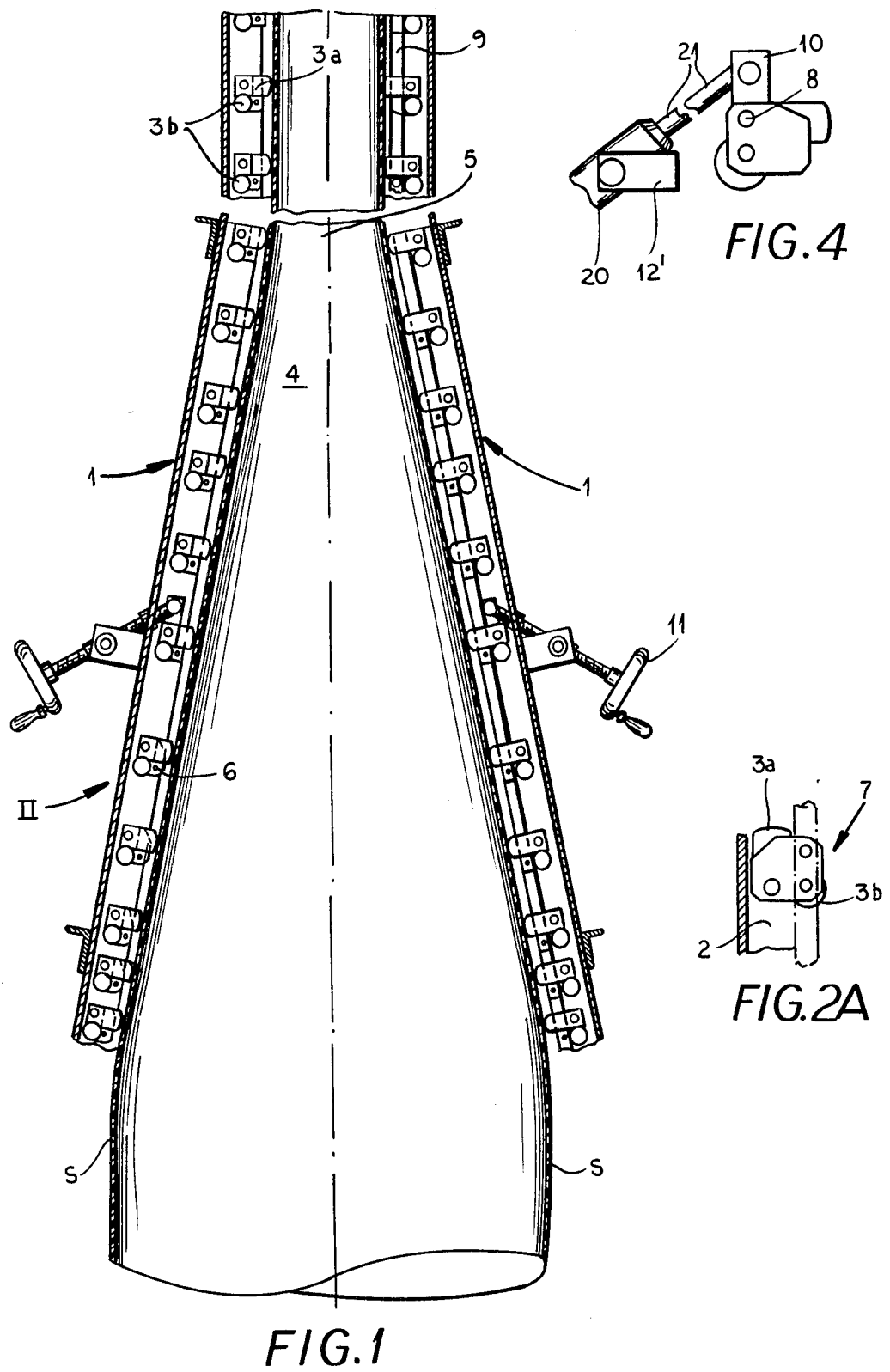
FIG. 1 is a diagrammatic side elevational view of the apparatus of my invention, partly broken away and attached to a blow-sheeting unit.
FIG. 2A is a detail view, the connecting rod being shown in dot-dash lines, of an assembly of FIG. 2 in its alternate position.
FIG. 4 is a diagram of another actuating system.
Figure 3:
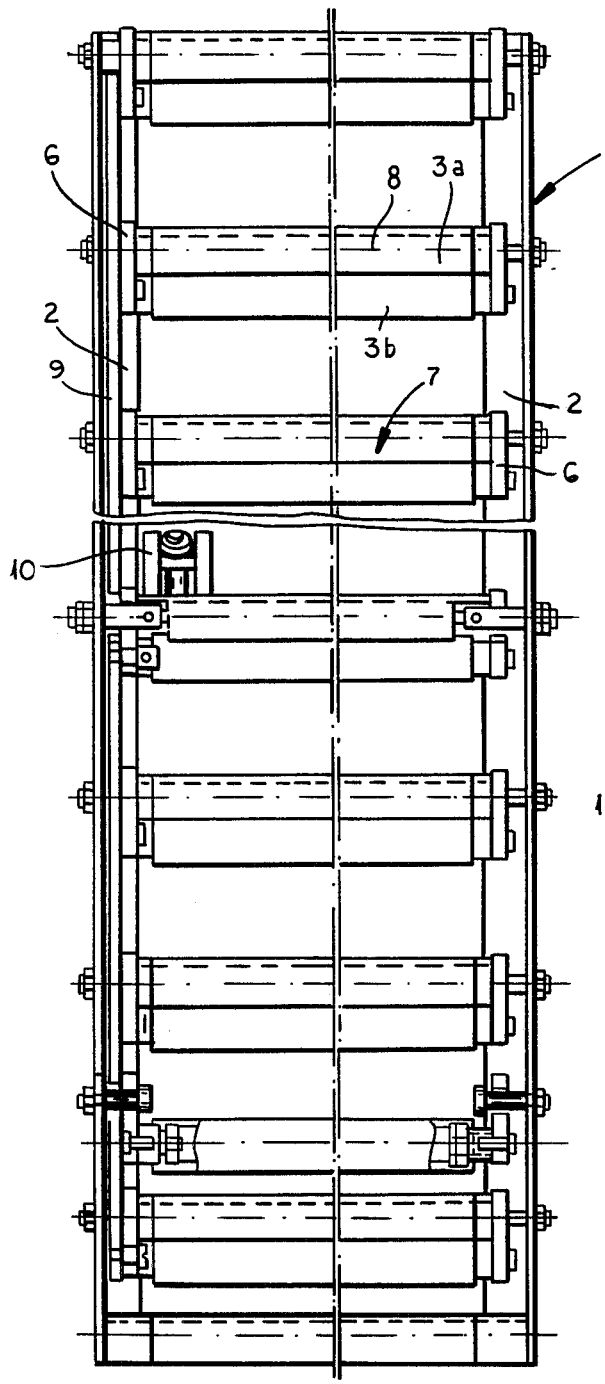
FIG. 3 shows a view from the right of item A in FIG. 2.

The apparatus represented in the drawing serves to flatten blown-foil tubes S in connection with the manufacture of plastic foils.

The apparatus consists of two opposite steel frames 1, which have longitudinal members or bars 2. The latter carry flattening elements 3a and 3b, arranged in ladder fashion.

Steel frames 1 form in the apparatus, according to FIG. 1, a wedge-shaped flattening zone 4, which is followed by another flattening zone 5 defined between parallel portions of the steel frame 1.

Steel frames 1 in the area of the wedge-shaped flattening zone 4 and the following zone may be constructed in the same way.

Figure 2:
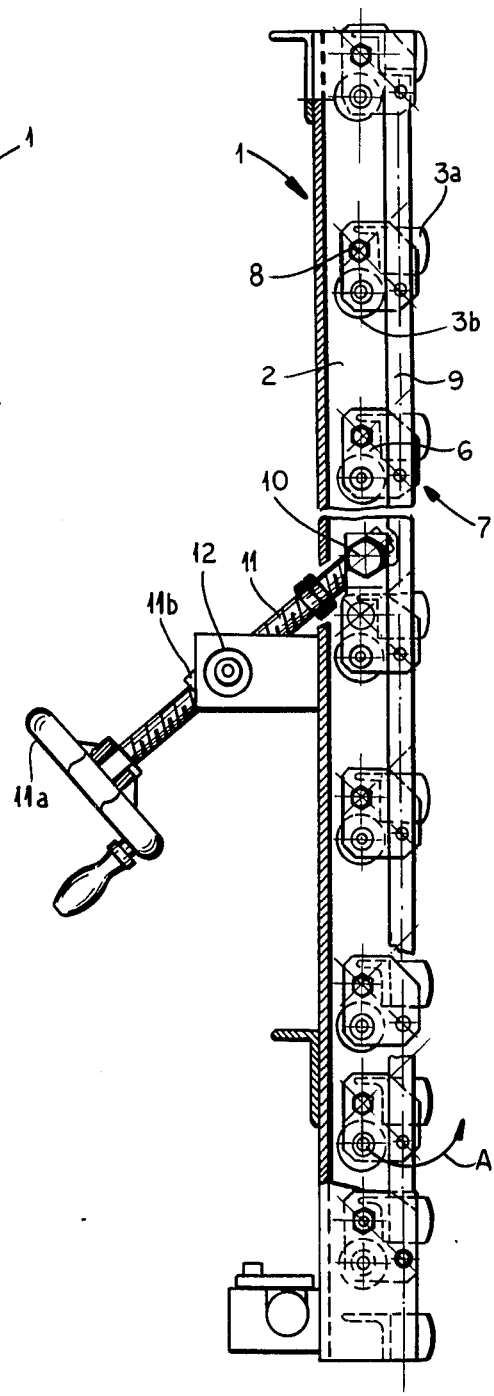
FIG. 2 is an enlarged section II of FIG. 1.

FIG. 2 is a detail view, similar to FIG. 2, showing one of the flattening assemblies in its alternative position.

Comparing FIGS. 2 and 2A, it can be determined that two flattening elements 3a or 3b, each with different flattening functions, are arranged parallel to each other between plates 6 and form flattening assemblies 7.

The flattening assemblies 7 are pivoted around axis 8, parallel to flattening elements 3a or 3b, as is clearly illustrated by the arrow A in FIG. 2.

It can be seen that rotation of the flattening assemblies 7 selectively places one or the other of the flattening elements 3a or 3b into operating position, whereby flattening elements 3a or 3b, projecting beyond the bars 2, come into contact with the blown-foil tubes.

FIG. 2 flattening device 3a, a wooden moulding, and an additional flattening device, a roll, make up flattening assembly 7.

An adjustable rod or connecting bar 9 is pivotally connected to a corresponding plate 6 of each flattening assembly 7 of the frame.

Adjustable rod 9, via a lever arm 10 which is attached to one of the plates 6, is pivotally connected with a threaded spindle 11 which forms the actuator. The spindle 11 has a handwheel 11a and is threaded into a nut 11b pivotally mounted on a brace 12 carried by the frame and can be fitted with appropriate ball bearings or other bearings.

The spindle may be replaced by a servomotor which can include hydraulic or pneumatic cylinders.

Actuator 11 will pivot flattening assemblies 7 at the same time around respective axes 8 with resulting parallel movement. Thus, operating servomotor 11 causes flattening elements 3a and 3b, with different flattening functions, to be placed selectively in operating position along the entire length of steel frame 1.

As can be seen in FIG. 4 the fluid-operated servomotor 20 is pivoted on the member 12' of the frame and has a piston or piston rod 21 pivotally connected to the lever 10.

I claim:

1. An apparatus for flattening a blown-foil tube which comprises:

a pair of opposing frames disposed on opposite sides of a blown-foil tube passing between said frames in a direction of displacement of said tube, each of said frames having a pair of longitudinally extending frame members; and a multiplicity of flattening assemblies spaced along each frame in said direction, each of said assemblies having:

a pair of differently functioning flattening elements extending parallel to one another between the respective frame members in ladder-ring orientation, respective end plates carrying both said elements at opposite ends thereof, and means for mounting said end plates on the respective frames so as to enable said assemblies to pivot about a respective axis parallel to said elements between a position in which one of said elements of each assembly is engageable with said tube and a position wherein the other of said elements is engageable with said tube.

2. The apparatus defined in claim 1 wherein said one of said elements is a wood bar.

3. The apparatus defined in claim 2 wherein said other element is a roller journaled on said plates.

4. The apparatus defined in claim 3, further comprising actuating means on each of said frames for simultaneously selectively pivoting a plurality of the assemblies thereof from a first of said positions to a second of said positions.

5. The apparatus defined in claim 4 wherein said actuating means includes a connecting bar pivotally connected to each of the said plates of said plurality of assemblies at least along one of said members of the respective frame.

6. The apparatus defined in claim 5 wherein said frames converge toward each other in said direction.

7. The apparatus defined in claim 5 wherein said actuating means includes a spindle operatively connected to said connecting bar for displacing same.

8. The apparatus defined in claim 7 wherein said spindle is provided with a handwheel for rotating same.

9. The apparatus defined in claim 5 wherein a positioning motor is connected to said connecting bar for displacing same.

10. The apparatus defined in claim 9 wherein said motor is a fluid-operated servomotor.

* * * * *